United States Patent
Helms

[19]

[11] Patent Number: 6,126,137
[45] Date of Patent: Oct. 3, 2000

[54] VIBRATION ISOLATION SYSTEM

[75] Inventor: Israel Helms, Coventry, R.I.

[73] Assignee: Advanced Isolation Systems, Ltd., Dublin, Ohio

[21] Appl. No.: 09/159,123

[22] Filed: Sep. 23, 1998

Related U.S. Application Data

[63] Continuation-in-part of application No. 08/792,024, Jan. 29, 1997, Pat. No. 6,000,671.

[51] Int. Cl.$^7$ ........................................... F16M 1/00
[52] U.S. Cl. .......................... 248/563; 248/636; 248/638; 248/566
[58] Field of Search ..................... 248/638, 636, 248/631, 632, 634, 562, 563, 561, 635, 189; 267/140.5

[56] References Cited

U.S. PATENT DOCUMENTS

| | | |
|---|---|---|
| 1,880,280 | 10/1932 | Replogle . |
| 2,597,800 | 5/1952 | Hussman . |
| 2,664,257 | 12/1953 | McNally . |
| 3,368,807 | 2/1968 | Thrasher . |
| 3,730,473 | 5/1973 | Pepi . |
| 3,784,146 | 1/1974 | Matthews . |
| 3,877,552 | 4/1975 | Higginson . |
| 3,917,201 | 11/1975 | Roll . |
| 4,399,987 | 8/1983 | Cucelli . |
| 4,537,382 | 8/1985 | Beck . |
| 4,648,577 | 3/1987 | Weber . |
| 4,757,980 | 7/1988 | Schubert . |
| 4,770,396 | 9/1988 | Jouade . |
| 4,821,205 | 4/1989 | Schutten . |
| 4,858,879 | 8/1989 | Miyamoto . |
| 4,893,800 | 1/1990 | Tabata . |
| 5,000,415 | 3/1991 | Sandercock . |
| 5,100,096 | 3/1992 | Mizuno . |
| 5,284,995 | 2/1994 | Gonzalez . |
| 5,348,266 | 9/1994 | Gertel . |
| 5,379,980 | 1/1995 | Houghton . |
| 5,390,892 | 2/1995 | Platus ................................. 248/638 X |
| 5,456,047 | 10/1995 | Dorka ................................. 248/638 X |
| 5,540,549 | 7/1996 | McGuire ........................ 267/140.13 X |
| 5,549,269 | 8/1996 | Gertel et al. ............................ 248/562 |

FOREIGN PATENT DOCUMENTS

| | | |
|---|---|---|
| 0-278-323 | of 1988 | European Pat. Off. . |
| 1227850 A1 | of 1986 | U.S.S.R. . |
| 1364789 A2 | of 1988 | U.S.S.R. . |
| 2001328 C1 | of 1993 | U.S.S.R. . |

Primary Examiner—Ramon O. Ramirez
Attorney, Agent, or Firm—Merek & Voorhees

[57] ABSTRACT

A vibration isolation system having at least three vibration isolation units. Each of the units preferably has the same general configuration. The isolation units each include a support stand having three (3) adjustable feet for adjustably supporting and leveling the isolation units on the floor of the site of operation of the precision equipment desired to be isolated. The units further include a fluid tight cylinder. The fluid tight cylinder is connected to the support stand via three uniformly spaced rods in such a fashion that allows horizontal movement of the cylinder relative to the support stand. A fluid is disposed in a chamber formed intermediate the fluid tight cylinder and the support stand thereby providing a thin film viscous shear damper for damping excitations having a horizontal component. The fluid tight cylinder is sealed by a diaphragm. A piston is positioned directly above the diaphragm. A pair of stops limit the upward and downward movement of the piston. A variable stiffener is positioned intermediate the lower stop and the piston to variably introduce the horizontal damper. A thin film viscous shear damper is positioned in the fluid tight cylinder for damping excitation in the vertical direction. The vertical damper is connected to the piston via a variable stiffener such that the vertical damper may be completely disconnected from the piston during the measuring stage to thereby avoid the transmission of any vertically oriented vibrations from the floor or otherwise, to the precision instrument. A support plate is connected to the piston for supporting at least a portion of the load of the precision machine. The isolation unit also includes a leveling valve for maintaining the precision machine level.

14 Claims, 12 Drawing Sheets

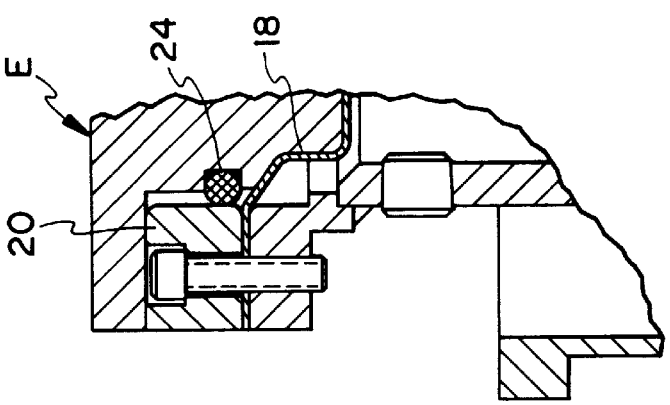
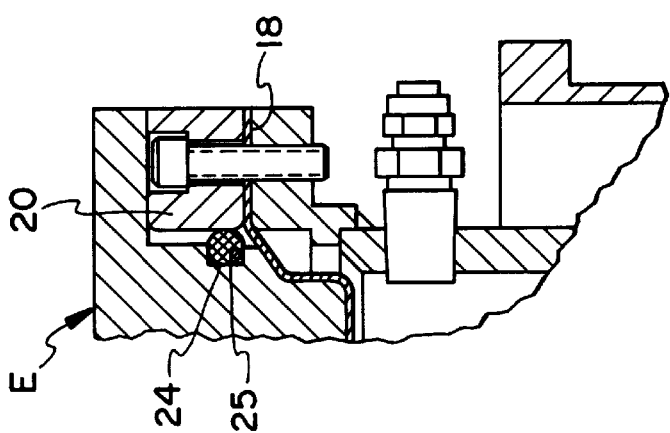
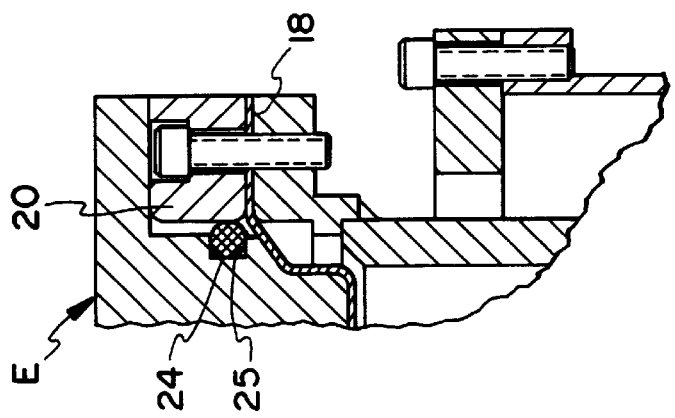
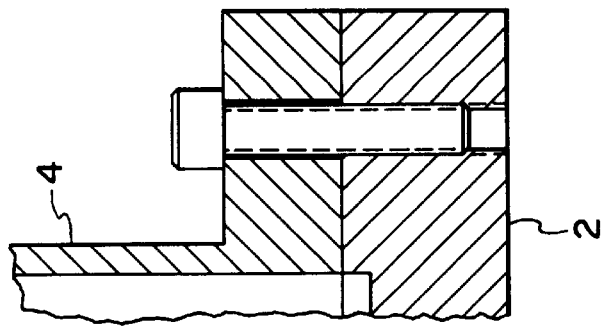

VIBRATION ISOLATION SYSTEM

RELATED U.S. PATENT APPLICATIONS

The subject application is a continuation-in-part of U.S. patent application Ser. No. 08/792,024 filed Jan. 29, 1997, the entire contents of which is hereby incorporated by reference.

FIELD OF THE INVENTION

The present invention is directed to a system for isolating vibration. The present invention is readily adaptable for use with coordinate measuring machines ("CMM") requiring a high level of precision. However, the present invention is in no way limited to use with only CMMs. Rather, the present invention can be readily adapted for use with any device needed to be isolated from vibrations.

BACKGROUND OF THE INVENTION

Various mounting arrangements have been developed for supporting sensitive instrumentation such a CMM, gyrocompasses, electron microscopes and other microprecision equipment or machines. Vibrations negatively affect the efficiency of these machines and hence mounting arrangements typically utilize vibration isolation systems to suppress vibrations and shocks at the site where the microprecision equipment is operated. The vibrations may be the result of: (1) the natural frequency of the surrounding structure; (2) the microprecision equipment itself, e.g., sudden movement of a measuring element in a CMM; and/or (3) vibrations resulting from environmental elements which enter the building where the microprecision equipment is operated. In the absence of vibration isolation equipment, vibrations will be transmitted to the precision equipment having both vertical and horizontal components.

Previously known conventional low frequency pneumatic isolation systems are designed with some form of elastically connected damper (e.g., an auxiliary reservoir with flow restrictors) applied in the vertical direction to improve the dynamics in settling and levelling, and provide some degree of isolation. Such a system is disclosed in U.S. Pat. No. 3,730,473. The effectiveness of such a system is significantly limited. First, the damping characteristics of the system cannot be readily modified, i.e., the damping characteristics are predetermined and are based on the size of the dual chambers (primary and auxiliary reservoirs) and the size of the restrictive passageways connecting the primary and auxiliary reservoirs. There is no simple and efficient means for adjusting the damping characteristics of the isolation system so that it can be used under varying operating conditions. This system is further limited in its ability to facilitate rapid settling of the precision equipment due to acceleration of a component (e.g., measuring or cutting element) of the precision equipment. This system is also limited in its ability to reduce the damping characteristic of the isolation system during the measuring or cutting stage of operation of the precision equipment thereby adversely impacting the isolation efficiency of the system. Moreover, this system is limited in its ability to provide smooth transition of the isolation system parameters between different stages of the cycle to avoid undesirable excitations at the point of measuring or cutting.

OBJECTS AND SUMMARY OF THE INVENTION

An object of the present invention is to provide a novel and unobvious vibration isolation system.

Another object of the invention is to provide a relatively simple and inexpensive isolation system which optimally satisfies the production floor environment enabling efficient operation of precision equipment having rapid movement and requiring highly accurate measurements.

A further object of the present invention is to provide an isolation system with improved stiffness-damping capability at the stage of acceleration to facilitate rapid settling.

Yet another object of the present invention is to provide an isolation system which automatically reduces the stiffness and damping characteristics during the measuring or cutting stage to improve isolation efficiency.

Still a further object of the present invention is to provide an isolation system having means to readily adjust the damping characteristic for varying operating parameters.

Yet a further object of the present invention is to provide an isolation system permitting smooth transitions of the isolation system parameters over different stages of the cycle thereby avoiding undesirable excitations during the measuring or cutting stage.

These and other objects of the present invention will be readily apparent upon review of the following detailed description of the invention and the accompanying drawings. These objects of the present invention are not exhaustive and are not to be construed as in any way limiting the scope of the claimed invention.

In summary, a preferred embodiment of a vibration isolation system formed in accordance with the present invention includes at least three vibration isolation units. Each of the units preferably has the same general configuration. The isolation units each include a support stand having three (3) adjustable feet for adjustably supporting and leveling the isolation units on the floor of the site of operation of the precision equipment desired to be isolated. The units further include a fluid tight cylinder. The fluid tight cylinder is connected to the support stand via three uniformly spaced rods in such a fashion that allows horizontal movement of the cylinder relative to the support stand. A fluid is disposed in a chamber formed intermediate the fluid tight cylinder and the support stand thereby providing a thin film viscous shear damper for damping excitations having a horizontal component. The fluid tight cylinder is sealed by a diaphragm. A piston is positioned directly above the diaphragm. Stops limit the upward and downward movement of the piston. A variable stiffener is positioned intermediate the lower stop and the piston to variably introduce the horizontal damper. The variable stiffener includes an annular elastomeric member having a circular cross-section. A thin film viscous shear damper is positioned in the fluid tight cylinder for damping excitation in the vertical direction. This damper includes a conically shaped plunger operably associated with a tapered well or cup. At least a portion of the plunger and cup are immersed in a liquid. The vertical damper is connected to the piston via a variable stiffener such that the vertical damper may be completely disconnected from the piston during the measuring stage to thereby avoid the transmission of any vertically oriented vibrations from the floor or otherwise, to the precision instrument. A support plate is connected to the piston for supporting at least a portion of the load of the precision machine. The isolation units also include a leveling valve for maintaining the precision machine level.

It will be readily appreciated by those of skill in the art, that the thin film viscous shear damper for damping excitations having a horizontal component may be omitted for those applications not requiring such, e.g., low frequency vertical and relatively higher frequency horizontal vibrations. However, where the precision instrument is used on an elevated floor or at shops with powerful horizontal impact equipment, it is preferable to employ the aforementioned horizontal damper. The above summary of the invention describes a preferred form and is not in any way to be construed as limiting the claimed invention to the preferred form.

BRIEF DESCRIPTION OF THE DRAWINGS

FIG. 5 is a sectional view taken along the lines H—H in FIG. 2;

FIG. 6 is a sectional view taken along the lines B—B in FIG. 2;

FIG. 7 is a sectional view taken along the lines D—D in FIG. 2;

FIG. 8 is a sectional view taken along the lines E—E in FIG. 2;

DETAILED DESCRIPTION OF THE INVENTION

The preferred embodiment will now be described with reference to FIGS. 1 to 9. It should be noted that only one isolation unit is depicted in FIGS. 1 to 9. Typically, at least three such units are employed to isolate a given precision machine such as a CMM. Additional units may be used in various circumstances to accommodate additional work loads. Because the configuration of each of the units is substantially the same, only one such unit need be described in detail.

FIGS. 1 TO 9

Figure 1:
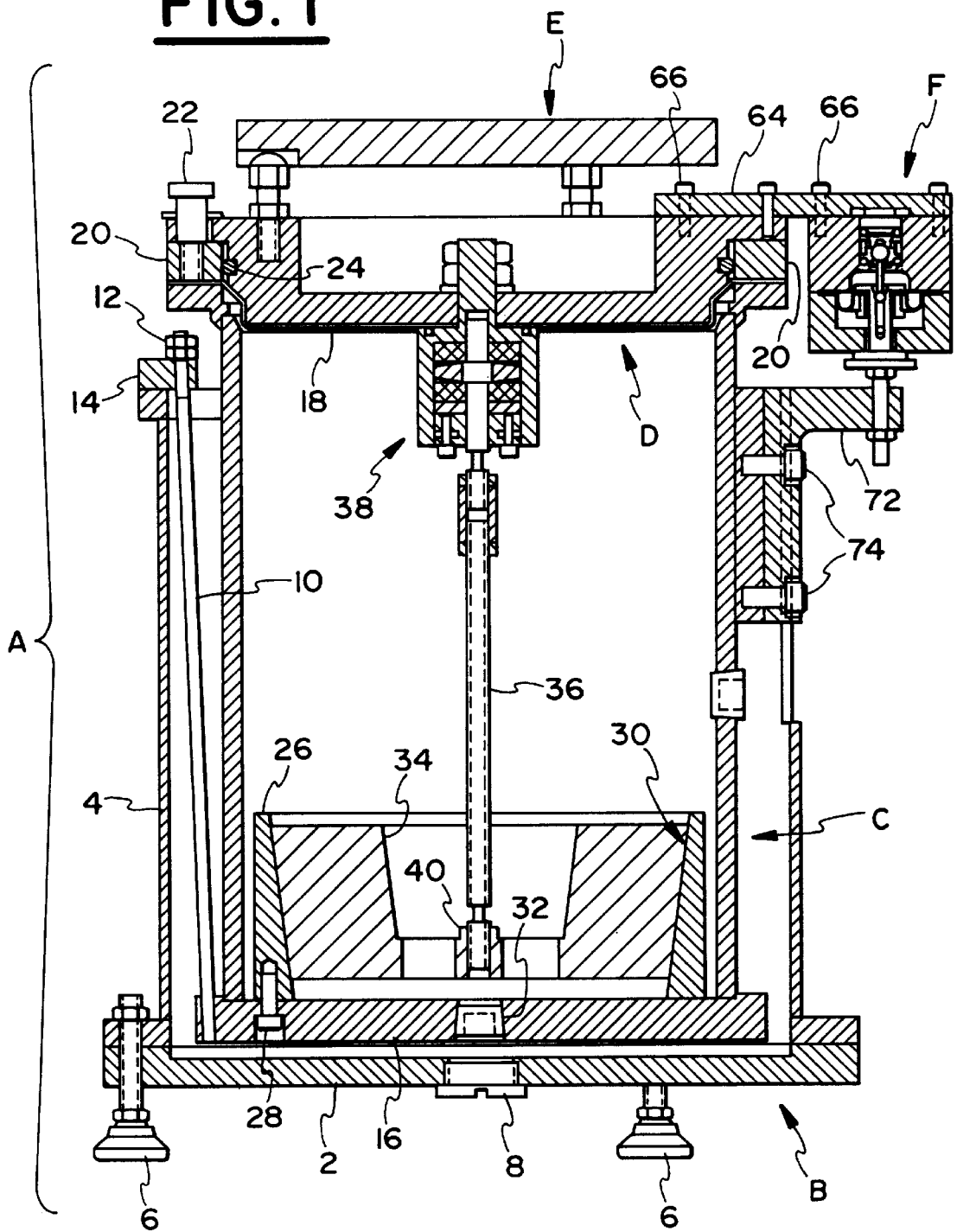
FIG. 1 is a sectional view of the preferred embodiment of the present invention.
Figure 2:
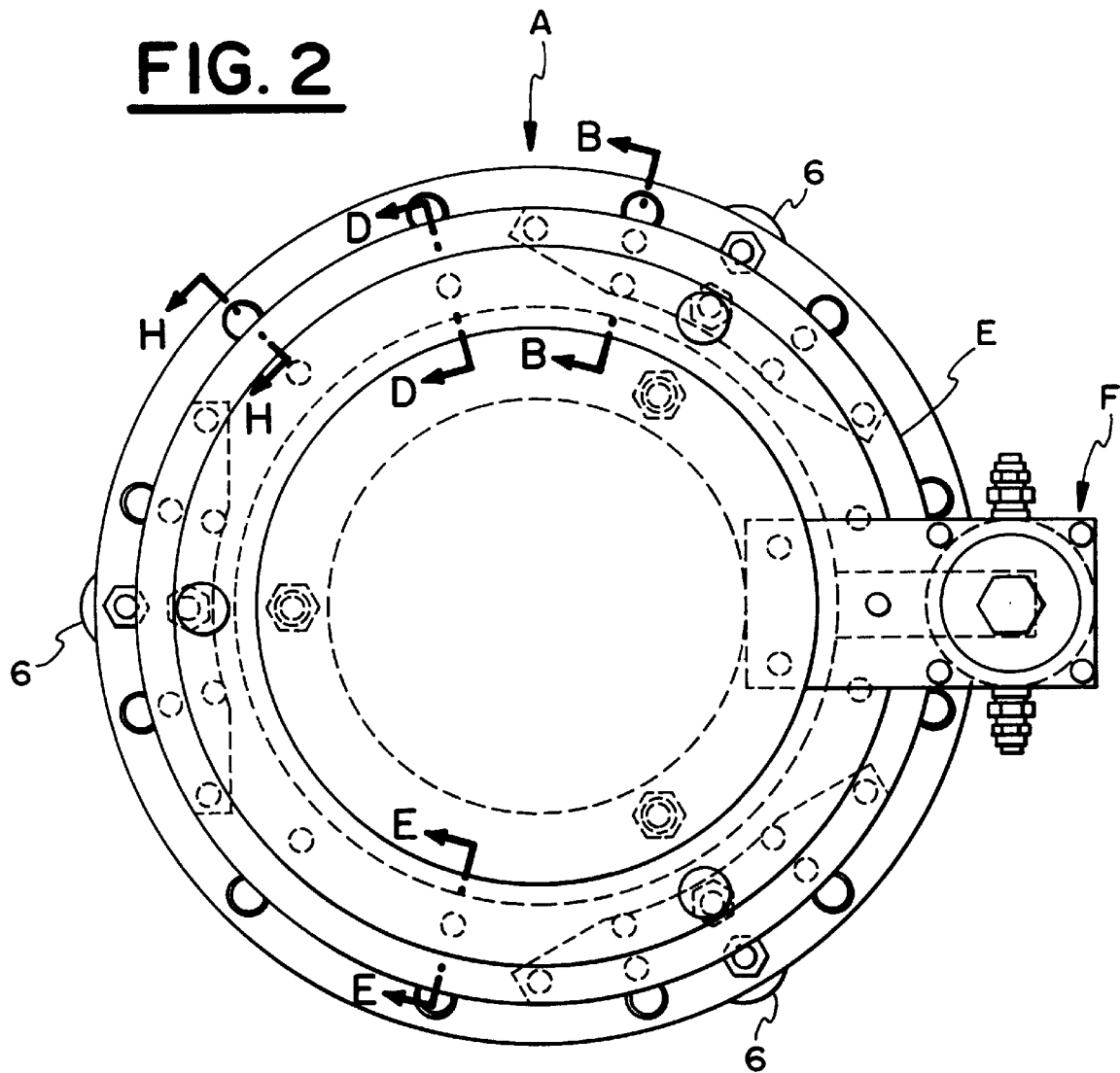
FIG. 2 is plan view of the preferred embodiment depicted in FIG. 1.

Referring to FIG. 1, the preferred form of an isolation unit A includes a support stand B, a fluid tight cylinder C, a piston D, a support plate E and a leveling valve F. The support stand B includes a generally cylindrical plate 2, a cylindrical collar 4 and three (3) circumferentially spaced adjustable feet 6, only two of which are shown in FIG. 1. It should be noted that under some circumstances support plate E may be omitted. The support stand B adjustably supports the isolation unit A on the floor of the site of operation of the precision machine. The collar 4 is secured to the cylindrical plate 2 by a plurality of fasteners. A seal (not shown) is positioned intermediate the plate 2 and collar 4 to prevent leakage of the liquid contained in support stand B. It should be noted that collar 4 and plate 2 can be made as one-piece. Such a construction would eliminate the need for an intermediate sealing element. Preferably, the liquid is a heavy oil having approximately 1000 cc dynamic viscosity. The support stand B also includes a drainage plug 8.

The fluid tight cylinder C is suspended from support stand B by three uniformly spaced rods 10, only one of which is depicted in FIG. 1. The rods 10 are fixed at the upper end via nuts 12 to the support shelf 14 of collar 4. The bore formed in support shelf 14, through which the rod 10 extends, has a diameter greater than the diameter of the corresponding section of rod 10. This arrangement permits rods 10 to move or swing in the horizontal direction. The opposite end of rods 10 are connected to the base 16 of fluid tight cylinder C. As is readily evident from FIG. 1, the base 16 is immersed in liquid, preferably heavy oil contained in the support stand B. The gap between plate 2 of support stand B and the base 16 of fluid tight cylinder C may be varied to vary the horizontal damping characteristics of the isolation unit via nuts 12. More specifically, by adjusting nuts 12 the distance between base 16 and cylindrical plate 2 may be varied.

Referring to FIG. 1, the fluid tight cylinder C is sealed by a diaphragm 18 at the top thereof. Piston D is mounted directly above the diaphragm 18. (See also FIGS. 6–8). Stops 20 and 22 are provided to limit the movement of piston D in the vertical direction. More specifically, stop 20 is an annular abutment which restricts the downward movement of piston D. FIG. 1 illustrates piston D in its lowermost position. It should be noted that piston D is not normally in contact with stop 20 but rather disposed a predetermined distance above it. Stop 22 includes three circumferentially spaced pins or screws, only one of which is depicted in FIG. 1. Stop 22 limits the upward movement of the piston D. It should be noted that the bores formed in piston D for receiving pins or screws 22 have a greater diameter than that of the corresponding sections of the pins or screws. Hence, the piston D can move in the horizontal direction relative to stop 22 and cylinder C.

An elastomeric element 24 is positioned intermediate piston D and stop 22. This is best seen in FIGS. 6 to 8. As is readily evident from FIGS. 6 to 8, piston D includes a square shaped groove 25 for receiving elastomeric ring 24. Ring 24 has a circular cross-section. The circular cross-sectional configuration of element 24 and the square shaped groove 25 in piston D are important because such an arrangement permits element 24 to act as a non-linear stiffener. This feature significantly improves the efficiency of the precision instrument as will be discussed in greater detail in the operation section of the subject specification.

Referring to FIG. 1, a cup or well 26 is positioned in the bottom of the fluid tight cylinder C. Preferably, the cup 26 is fixed to the bottom of fluid tight cylinder C via three pins or screws 28. The inner side wall 30 of the cup or well 26 is tapered. A plurality of openings (not shown) are formed in the lower portion of cup 26. These openings permit liquid in the bottom of the fluid tight cylinder C to flow into the cup or well 26. Preferably, the liquid contained in the fluid tight cylinder C is a heavy oil having approximately a 1000 cc dynamic viscosity. A drainage plug 32 is disposed in the center of base 16.

A conically shaped plunger 34 is received in cup or well 26. The conical shape of plunger 34 is compatible with the tapered inner wall 30. During normal operation of the isolation unit, a gap is present between the exterior wall of plunger 34 and the tapered wall 30 of cup 26. A rod 36 extends between the plunger 34 and piston D. The lower end of rod 36 is connected to plunger 34 via nut 40. The upper end of rod 36 is connected to piston D by non-linear stiffener 38. This latter arrangement is best seen in FIGS. 1 and 9.

Figure 9:
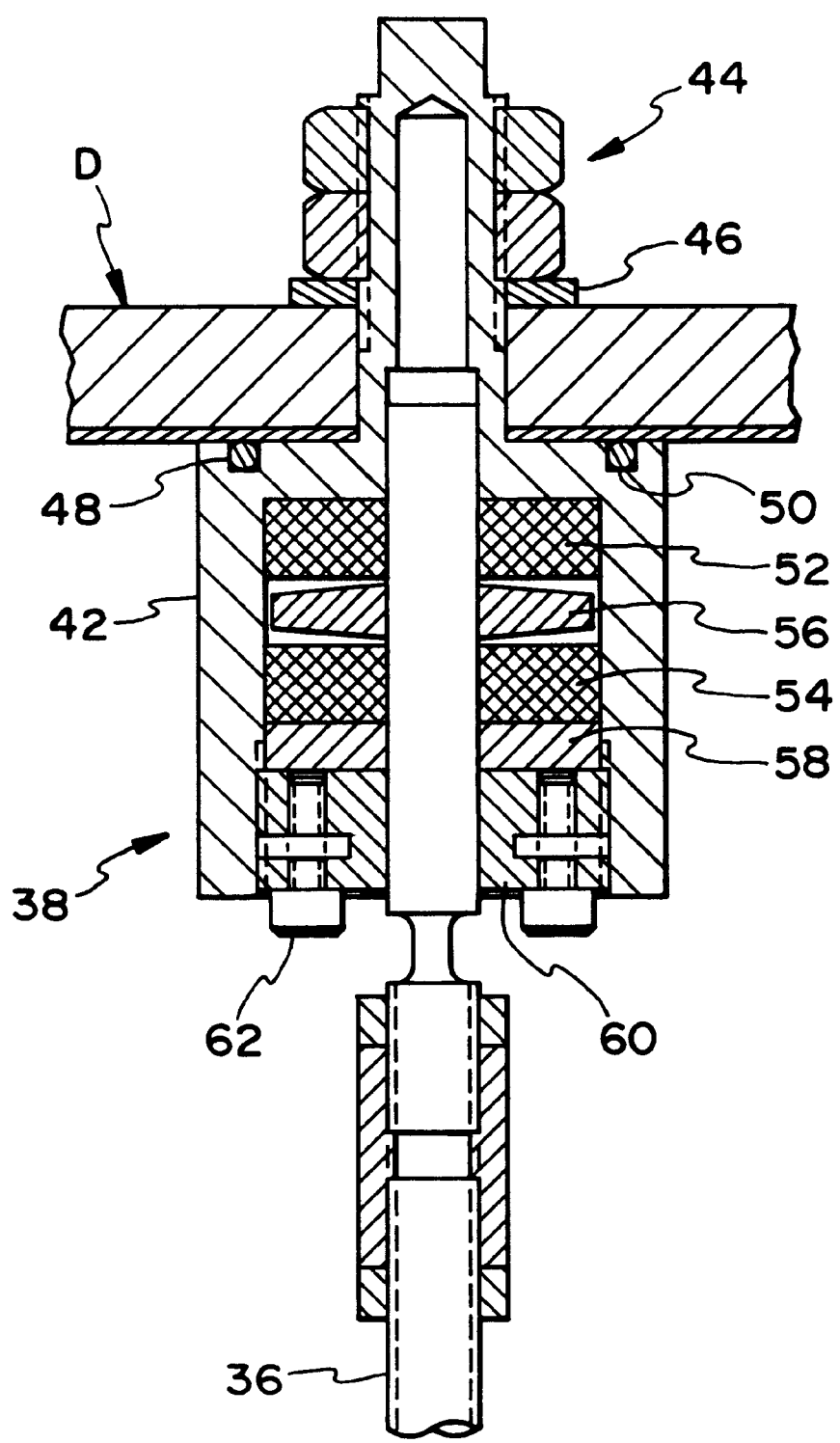
FIG. 9 is an enlarged view of a portion of the preferred embodiment illustrated in FIG. 1.

Referring to FIG. 9, the upper end of rod 36 is disposed in housing 42 which is fixed to piston D via nut 44 mounted over a washer 46. Annular seals 48 and 50 are provided to maintain a fluid tight seal. Inside housing 42 are a pair of annular elastomeric pads 52 and 54. These pads each have a rectangular cross-section as illustrated in FIG. 9. Positioned intermediate pads 52 and 54 is a metal ring 56. However, this ring has a tapered cross-section to provide a non-linear stiffener, the importance of which will be described in greater detail in the operation section of the subject specification. Ring 56 is slightly spaced from both the pads 52 and 54 when the system is not encountering excitation in the vertical direction. It should be noted that under these circumstances the vertical damper is completely disconnected from the piston D and hence the precision machine. This is a significant improvement over previously known devices because no floor excitations having a vertical component are transmitted to the precision machine through the damper. The tapered ring 56 is fixed to rod 36, i.e., ring 56 moves with rod 36. It should be noted that rod 36 is permitted to move relative to housing 42 a distance equal to the gap distance, i.e., the gap between ring 56 and either pad 52 or 54 depending upon whether the movement is in the upward or downward direction. A metal washer 58 is also disposed in housing 42. A threaded retaining cap 60 and a pair of screws 62 cooperate to contain the various elements disposed in housing 42, and set-up the initial preload in the non-linear stiffner.

Referring to FIG. 1, a support plate E is connected to piston D. The support plate E carries at least a portion of the load of the precision machine.

Figure 3:
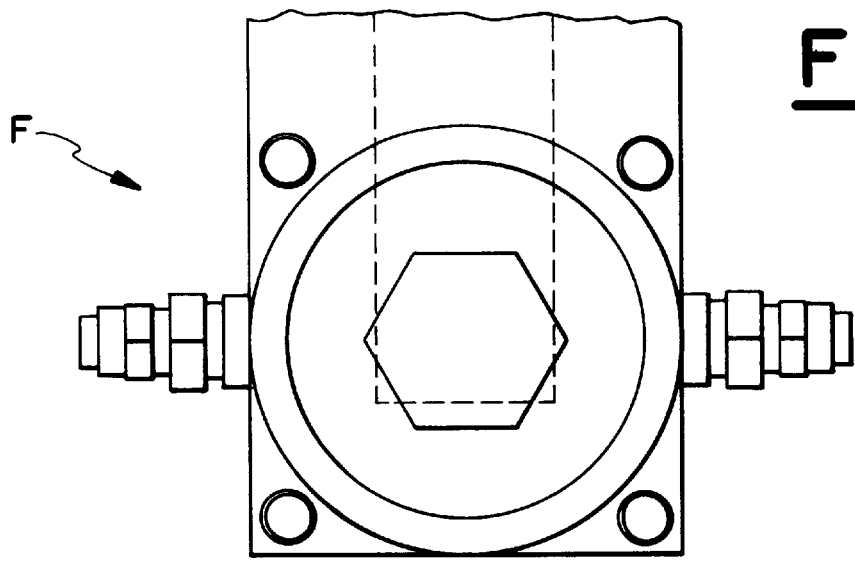
FIG. 3 is a fragmentary enlarged plan view of the preferred form of leveling valve.
Figure 4:
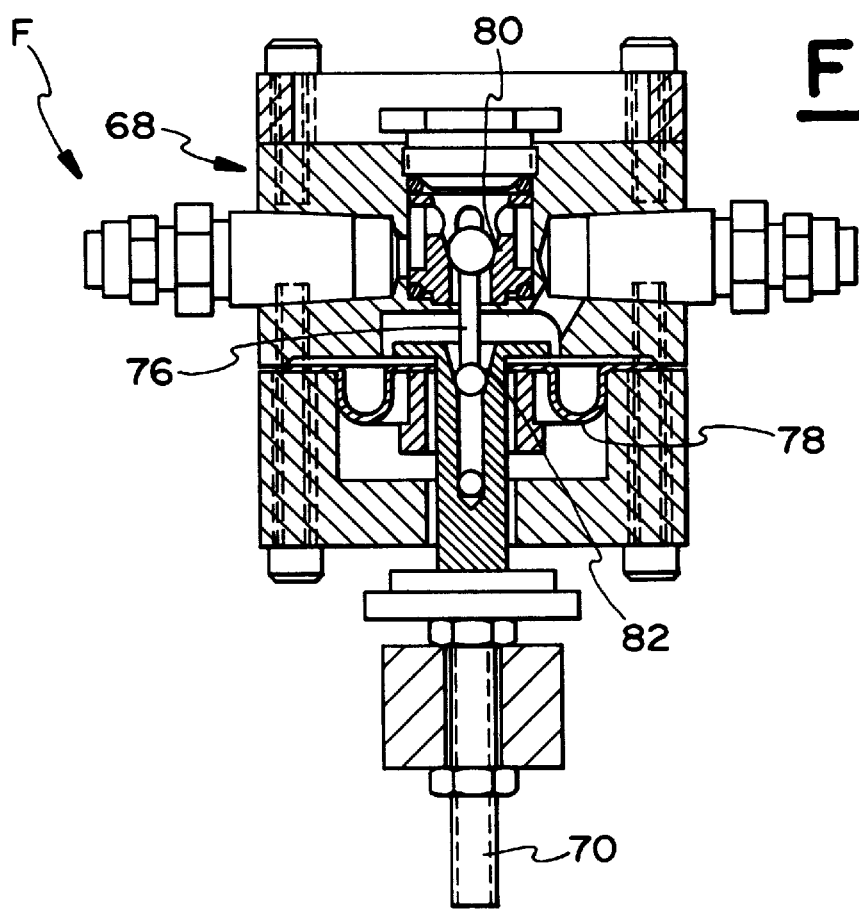
FIG. 4 is an enlarged sectional view of the preferred form of leveling valve.

Referring to FIGS. 1, 3 and 4, leveling valve F is connected between piston D and the fluid tight cylinder C. The connection of the leveling valve F to piston D is accomplished by a plate 64 and a plurality of fasteners 66, best shown in FIG. 1. The housing 68 of leveling valve F is fixed relative to the piston D, i.e., housing 68 moves with piston D. The valve stem 70 is fixed to the fluid tight cylinder C via L-shaped bracket 72 and screws 74. A pair of air lines (not shown) are connected to valve F in a conventional manner. The first line is an air supply line for supplying air under pressure to the valve F. The second line is a supply line extending between the valve F and the fluid tight cylinder C for supplying air under pressure to the fluid tight cylinder C. Valve pin 76 is normally biased in the position illustrated in FIG. 4 via diaphragm 78. In this position both air supply seat 80 and air exhaust seat 82 are closed precluding air from being supplied to or exhausted from the fluid tight cylinder C. In the event that piston D moves downward from its normal operating position, the air supply seat 80 is opened due to the downward movement of housing 68. This results in pressurized air being supplied to the fluid tight cylinder C. The piston in turn resumes to a position wherein the precision machine is once again level. In the event of an upward movement of piston D from its normal operating position, the air exhaust seat 82 opens causing air to be exhausted from the fluid tight cylinder C. This in turn results in piston D moving downward from its normal operating position thereby leveling the precision machine.

OPERATION

The operation of isolation unit A will be described hereinafter with respect to the isolation of a CMM. CMMs typically have high speed moving elements such as a measuring probe. The probe is typically suspended above the body of the CMM by a bridge or cantilever arrangement. This results in a rather large vertical offset between the probe and the body of the CMM. These CMMs impose large moments of excitation on the isolation system owing to the high speed and acceleration of the measuring probe. Also, large vertical forces are applied to the isolation mounts owing to the relocation of payloads.

As indicated above, both the horizontal and vertical dampers are connected in series to the mass via a variable stiffener. The stiffener is variable or adjustable between a completely rigid state and zero ridigity state. When the stiffener is completely rigid the damper in effect is directly connected to the mass providing maximum damping. Maximum damping is desirable during high speed acceleration of the measuring probe of a CMM. When the stiffener has zero rigidity the damper is in effect disconnected from the mass. This is desirable during the measuring stage of a CMM. More specifically, no floor vibrations will be transmitted to the mass via the damper. This improves the efficiency of the isolation system significantly. In addition, because the stiffeners act in a non-linear fashion, settling of the system occurs more rapidly than a conventional spring acting linearly.

Upon rapid acceleration of the measuring probe of the CMM, the piston D will move rapidly in either the upward or downward direction. In turn, housing 42 will move with piston D and relative to rod 36 and tapered ring 56. By this movement, either elastomeric member 52 or 54 will be fully compressed against ring 56 and thereby rigidly connecting the vertical damper to the CMM. This provides maximum damping. The vertical damper is a thin film viscous shear damper. The damping characteristic can be readily varied as the operating parameters dictate by adjusting the gap between the plunger 34 and the inner wall 30 of cup 26 via nut 40. As the measuring probe slows, the damping characteristics are automatically lessened owing to the expansion of either elastomeric member 52 or 54 from the fully compressed state. Because of the tapered, i.e., conical configuration of the two ends of ring 56 the elastomeric members 52 and 54 are able to act in a non-linear fashion. More specifically, the ends of metal ring 56 are shaped to provide progressively increasing surface area contact between either elastomeric elements 52 or 54 and ring 56. Using an example of an upward force being exerted on piston D, the rod 36 and ring 56 in turn will move upwardly causing deformation of elastomeric ring 52. This deformation will lead to an increase in surface area contact between the upper surface of ring 56 and the lower surface of elastomeric member 52.

Hence, settling of the system occurs more rapidly. It will be readily appreciated that arrangements other than the conically shaped ends of metal ring 56 and the rectangular cross-section of elastomeric members 52 or 54 may be utilized. The only limitation on such arrangements is to ensure action of the operative elements in a non-linear fashion.

The isolation unit A operates in a similar fashion to isolate vibrations having a horizontal component. Specifically, when the isolation unit encounters vibrations having a large horizontal component, the piston D moves rapidly relative to annular abutment 20 to fully compress a portion of the element 24 thereby fully engaging the horizontal damper providing maximum horizontal damping. Further, the circular cross-section of ring 24 permits the ring to act in a non-linear fashion. Thus, the system is able to settle more quickly along the horizontal component. Once again it is to be noted that arrangements other than a circular elastomeric member may be utilized. What is desirable is the non-linear response.

FIRST ALTERNATIVE EMBODIMENT

A first alternative embodiment of the present invention will now be described with reference to FIGS. 10 and 11. Elements of the alternative embodiment that are similar to the preferred embodiment illustrated in FIGS. 1 to 9 are given the same reference letter or number with the addition of a prime to signify the alternative embodiment.

Figure 10:
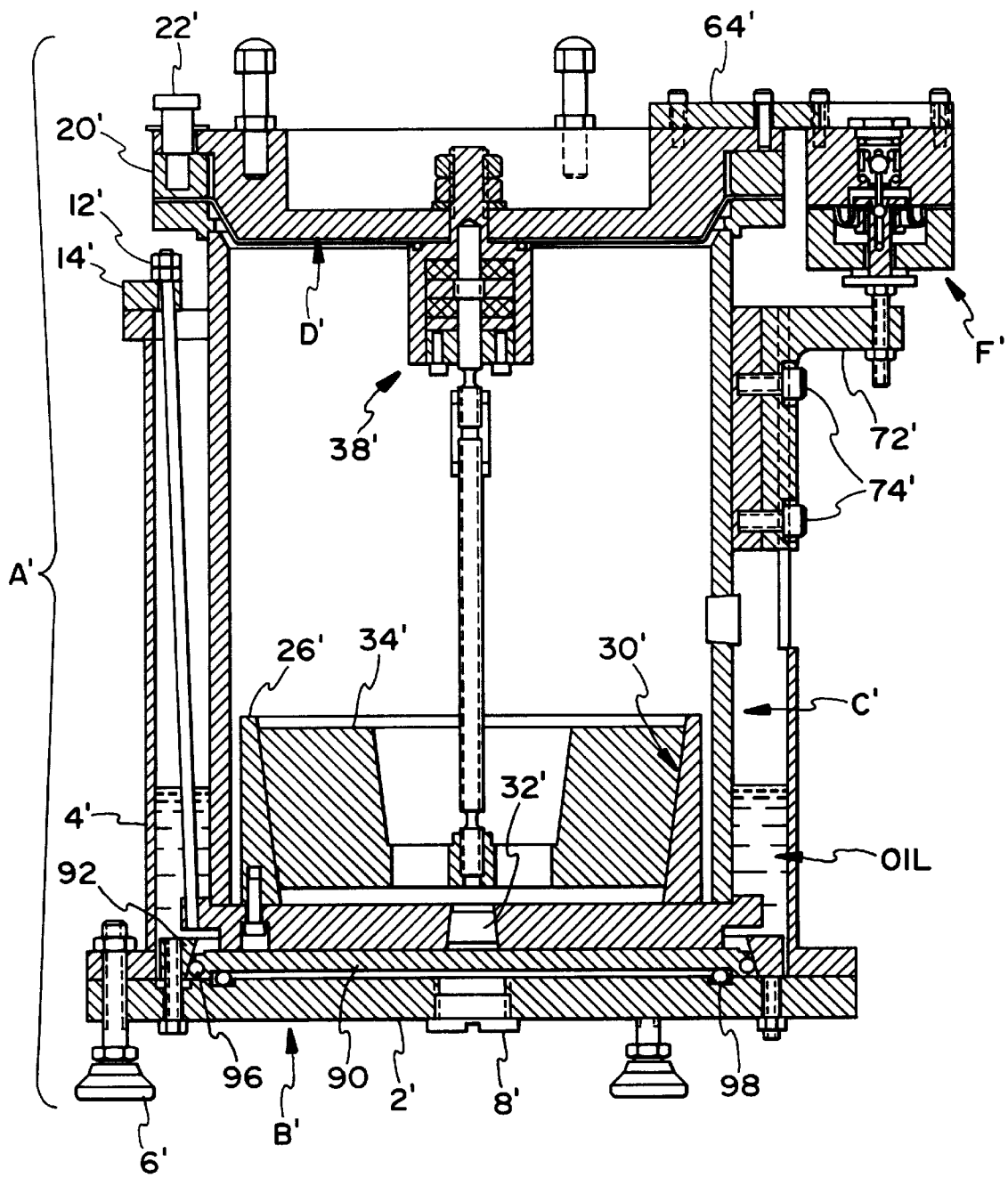
FIG. 10 is a sectional view of another preferred embodiment of the present invention.
Figure 11:
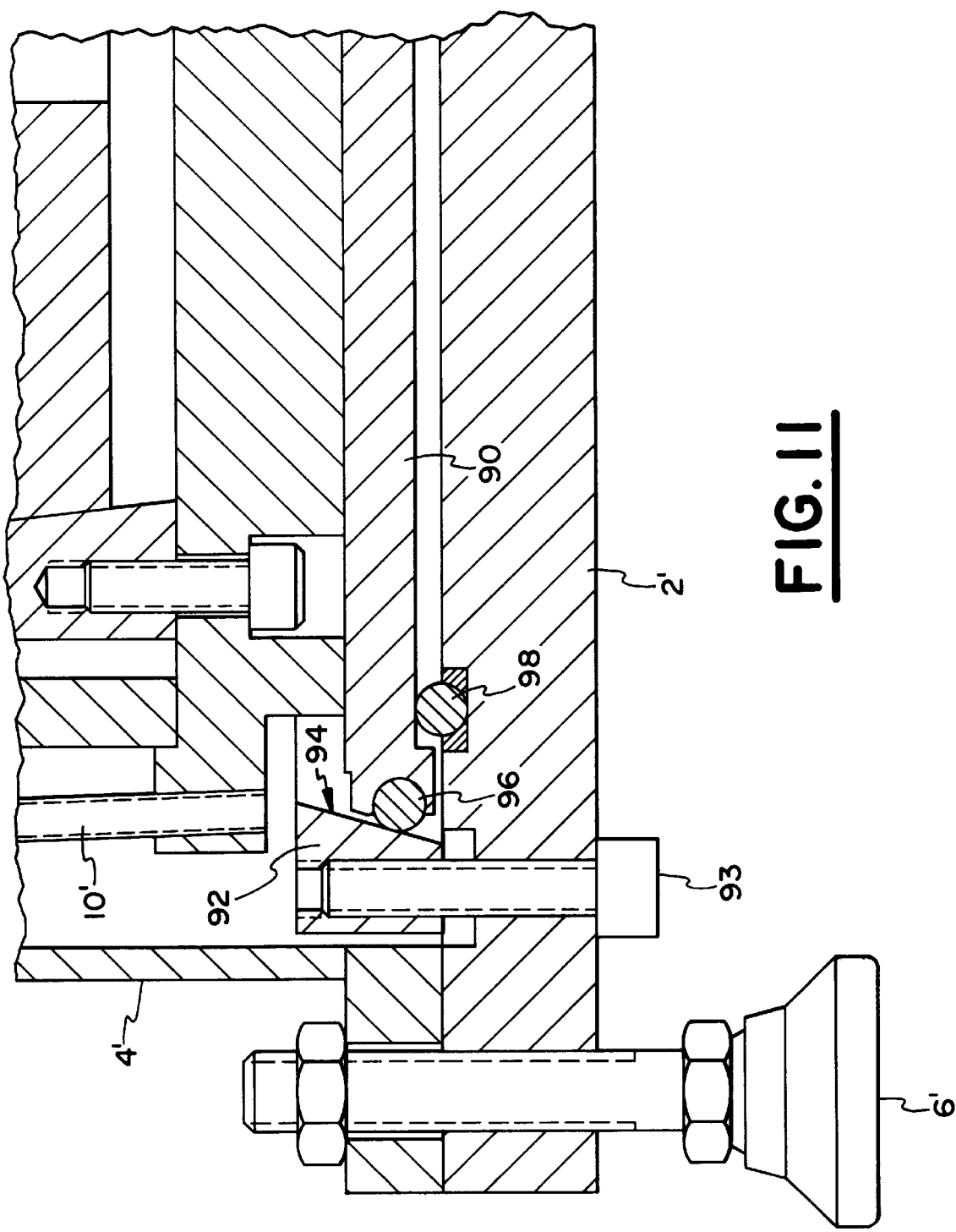
FIG. 11 is an enlarged view of a portion of FIG. 10.

As seen in FIG. 10, the isolation unit A' includes a support stand B', a fluid tight cylinder C', a piston D' and a level valve F'. The vertical damper of the isolation unit A' operates in exactly the same manner as the isolation unit A. Hence, no further elaboration is necessary on this aspect of isolation unit A'. The difference between isolation units A and A' is found in the removal of the elastomeric member 24 and the addition of several elements in cylindrical collar 4'. These elements include a plate 90 which is disposed between cylindrical plate 2' and base 16'. An annular member 92 surrounds the plate 90. A plurality of screws 93 fix the member 92 to cylindrical plate 2' to preclude relative horizontal movement between these two elements. However, screws 93 permit adjustment of the member 92 in the vertical direction relative to cylindrical plate 2'. The annular member 92 includes an inner wall 94 which is tapered. An annular elastomeric member 96 is disposed adjacent the tapered wall 94. The elastomeric member 96 has a circularly shaped cross section and is disposed in a square-shaped notch formed in plate 90. Preferably, plate 90 rests on bearings 98 to permit plate 90 to move freely relative to cylindrical plate 2'.

The operation of the horizontal damper will now be described. Upon exertion of horizontal forces on the piston D', the base plate 16' will move which in turn will cause plate 90 to move with it owing to the viscous forces created by the heavy oil between plate 16' and plate 90. Preferably, the heavy oil has the same viscosity as that used in isolation unit A. While the base plate 16' and plate 90 move as one, there is no horizontal damping. However, upon engagement of elastomeric element 96 with wall 94, plate 90 will move relative to plate 16' resulting in shear damping of vibrations having a horizontal component. When the elastomeric member 96 is fully compressed to a rigid state maximum damping is achieved. The circular cross-section of member 96 permits varying of the horizontal damping in a non-linear fashion, i.e., the horizontal damper is introduced and removed from the system in a non-linear fashion. This is desirable for the reasons previously stated.

By adjusting the height of annular member 92 the damping characteristics can be varied. More specifically, the gap between wall 94 and elastomeric member 96 may be varied to vary the horizontal damping effects of unit A'.

SECOND ALTERNATIVE EMBODIMENT

A second alternative embodiment of the present invention will now be described with reference to FIGS. 12 through 16. It should be again noted that only one isolation unit is illustrated in FIG. 12 through 16. Typically, at least three units are employed to isolate a given precision machine such as a CMM. Additional units may be used in various circumstances to accommodate additional loads. Because the configuration of these units is substantially the same, only one such unit need be described.

Figure 12:
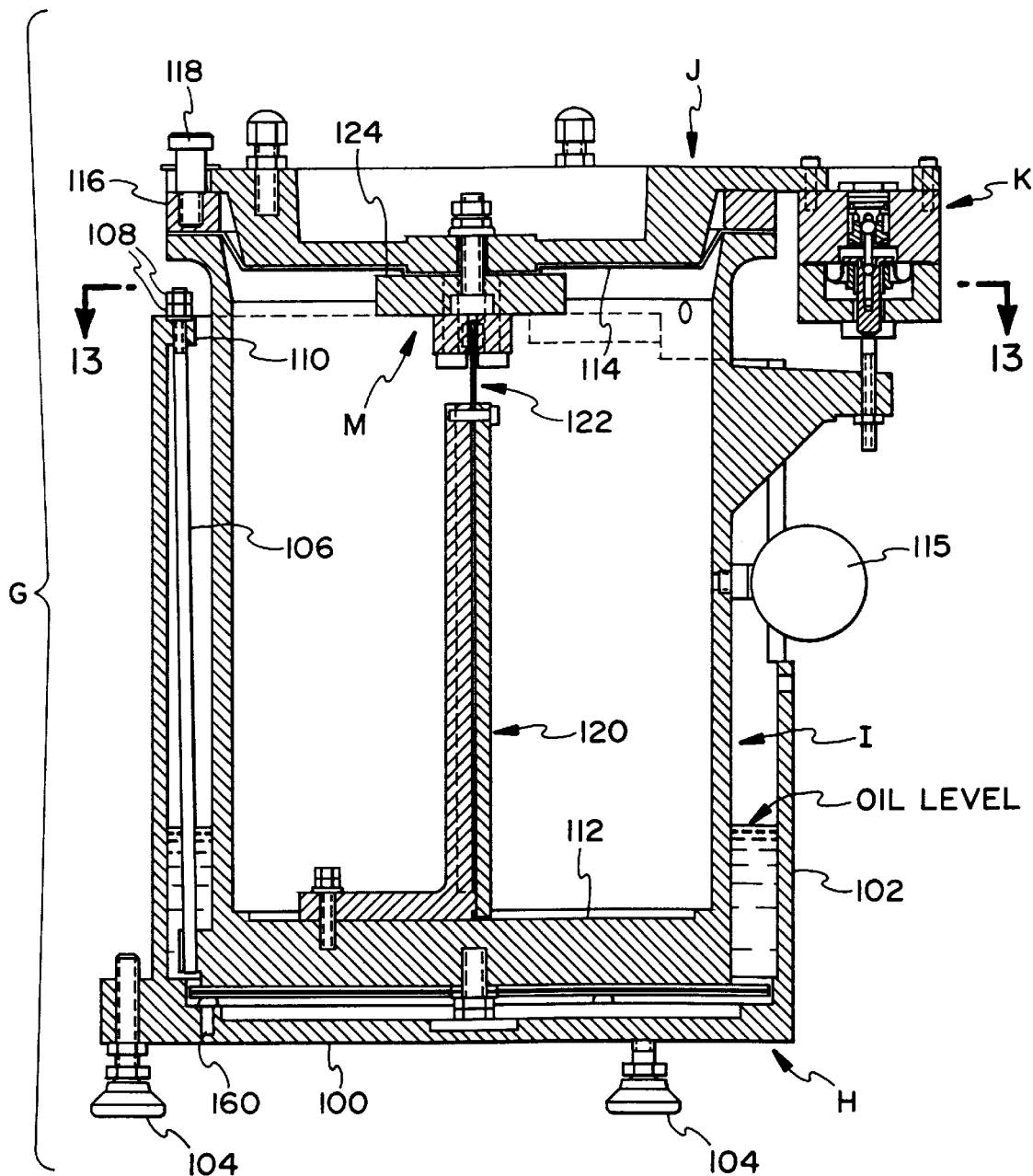
FIG. 12 is a front elevational view of yet another preferred embodiment of the present invention.
Figure 13:
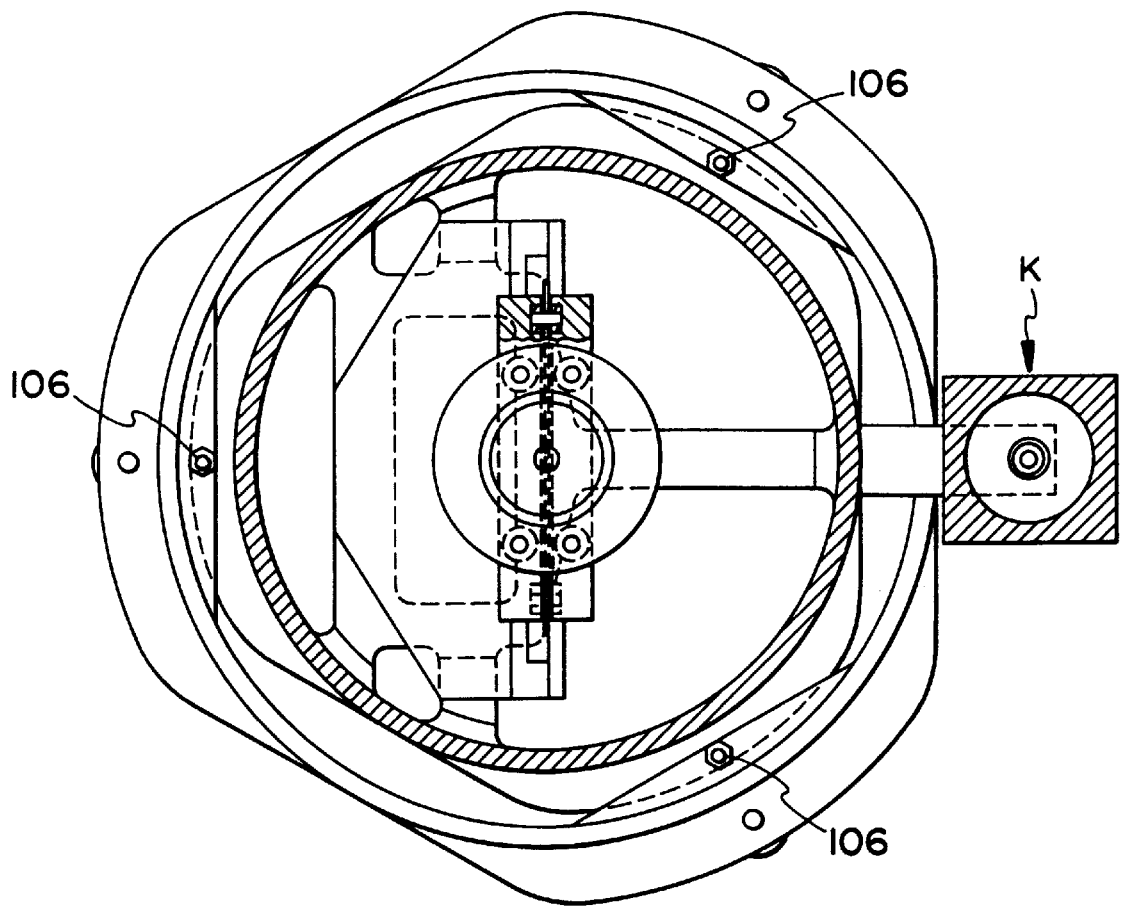
FIG. 13 is a sectional view taken along lines B—B of FIG. 12.

Referring to FIG. 12, isolation unit G includes a support stand H, a fluid tight cylinder I, a piston J and a leveling valve K. A support plate (not shown) similar to that used in isolation unit A is fixed to the piston J. The support stand H includes a generally cylindrical base plate 100, a generally cylindrical collar 102 and three circumferentially spaced adjustable feet 104, only two of which are shown. The support stand H adjustably supports the isolation unit G on the floor of the site of operation of the precision machine. The collar 104 is formed as one-piece with the base plate 102. However, it will be readily appreciated that such may be formed as two pieces as in the isolation unit A. The support stand H is partially filled with a heavy oil having approximately 1000 cc dynamic viscosity. The support stand H can be provided with a drainage plug similar to that used in isolation unit A to drain the liquid when desired.

The fluid tight cylinder I is suspended from the support stand H by three uniformly spaced rods 106, only one of which is shown in FIG. 12. The rods 106 are fixed via a pair of nuts 108, one stacked on the other, to the shelf 110 of collar 104. The bore formed in shelf 110 has a diameter greater than the diameter of corresponding rod 106 permitting rod 106 to move or swing in the horizontal direction. The opposite ends of rods 106 are connected to base 112 of the fluid tight cylinder I. As is readily evident from FIG. 12, the base 112 of the fluid tight cylinder I is immersed in liquid, preferably heavy oil contained in the support stand H.

Referring to FIG. 12, the fluid tight cylinder I is sealed by a diaphragm 114 at the top thereof. Air pressure gauge 115 monitors the air pressure in the fluid tight cylinder I. Piston J is mounted directly above the diaphragm 114. Stops 116 and 118 are configured and limit the travel of piston J in the same manner as the corresponding stops 20 and 22 of isolation unit A. FIG. 12 illustrates piston J in its lowermost position. It should be noted that piston J is not normally in contact with stop 116 but rather is disposed a predetermined distance above it. Optionally, an elastomeric element similar to element 24 of isolation unit A may be positioned between piston G and stop 116.

Referring to FIG. 12, a fluid tight well 120 is secured to the bottom of the fluid tight cylinder I. The fluid tight well has a C-shaped channel for retaining a fluid and receiving blade 122. Preferably, blade 122 is formed from spring steel. It will be readily appreciated that other materials may be used including but not limited to plastics. Preferably, the C-shaped channel of fluid tight well 120 has a width of 0.050 of an inch while blade 122 has a thickness of 0.020 of an inch. Accordingly, blade 122 is free to move up and down in the C-shaped channel of the fluid tight well 120. Blade 122 is preferably generally rectangular in shape. It should be noted that blade 122 is extremely light in comparison to the corresponding element of isolation unit A. The reduction in weight of the vertical damper significantly enhances the operation of the isolation unit.

Figure 14:
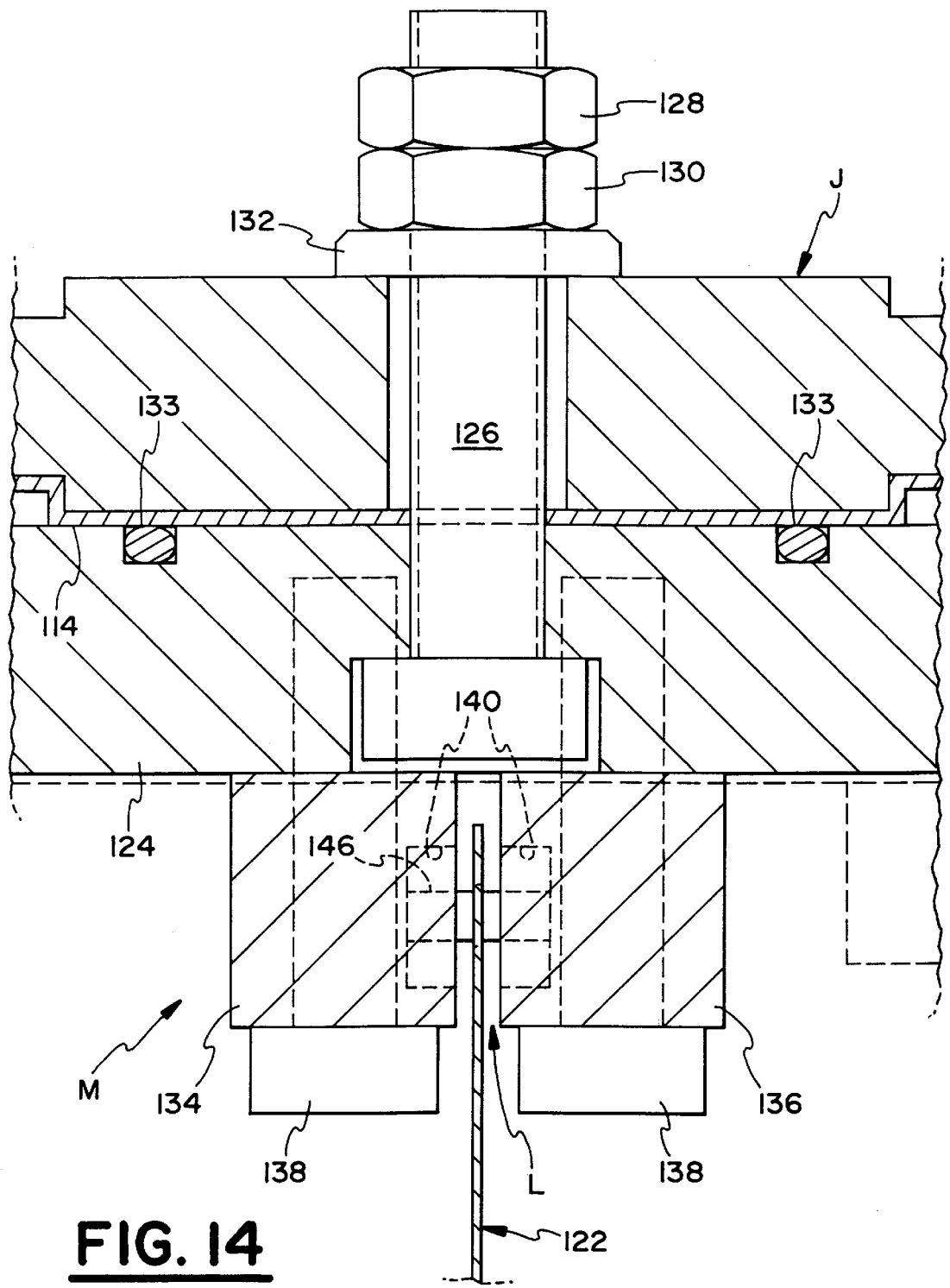
FIG. 14 is an enlarged view of a portion of the preferred embodiment illustrated in FIG. 12.
Figure 15:
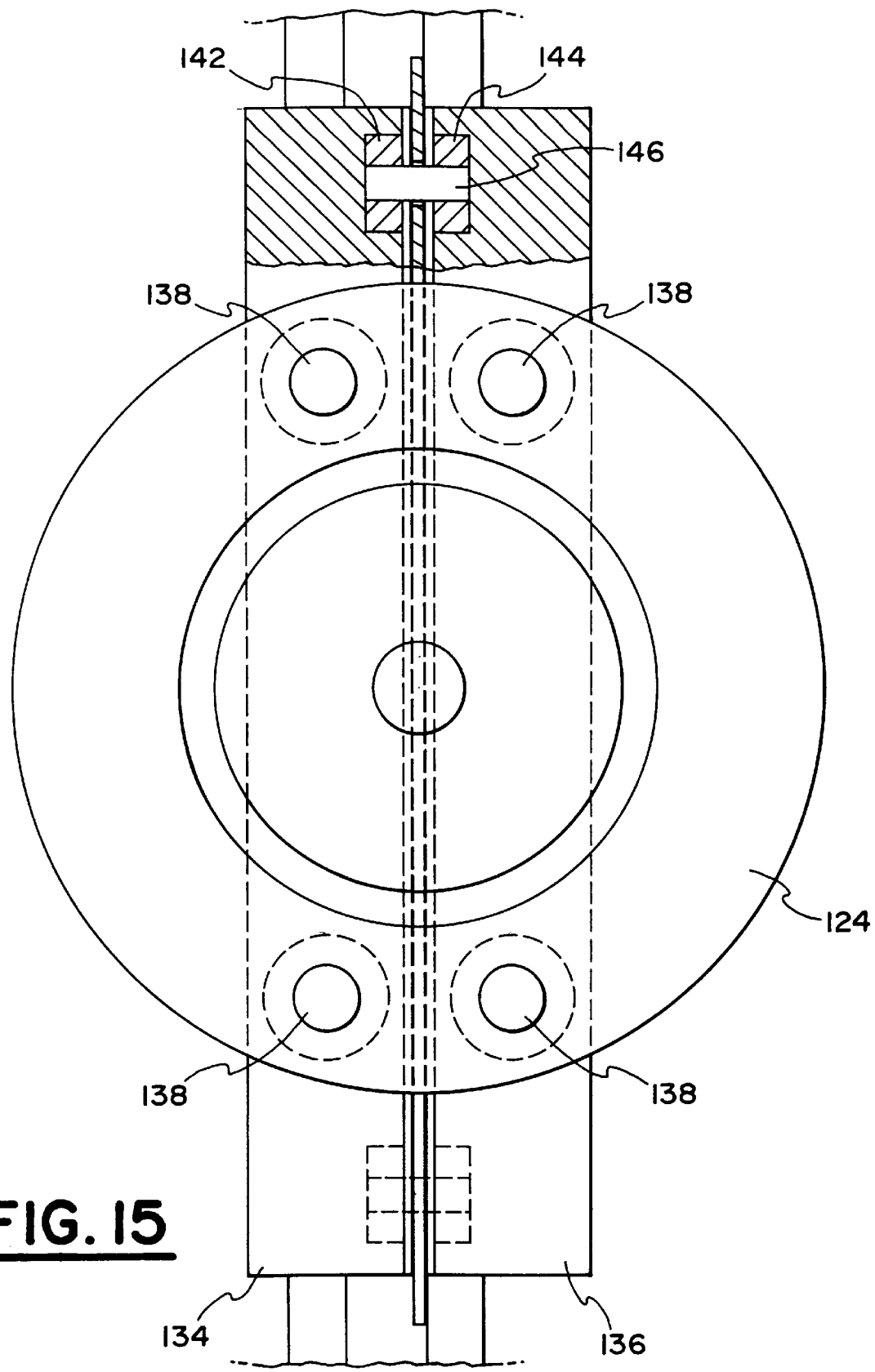
FIG. 15 is an enlarged view of another portion of the preferred embodiment illustrated in FIG. 12.

Referring to FIGS. 14 and 15, the blade 122 is connected to piston J via a non-linear, adjustable stiffener L housed in a mounting assembly M. The mounting assembly M includes a substantially cylindrical plate 124 connected to piston J via bolt 126, nuts 128 and 130, and washer 132. An 0-ring 133 is positioned intermediate plate 124 and the diaphragm 114. As seen in FIG. 14, a pair of support arms 134 and 136 are secured to plate 124 via bolts 138 in a spaced relationship. Support arms 134 and 136 include circular recesses 138 and 140, respectively on the internal surfaces thereof. The recess 138 and 140 have disposed therein correspondingly shaped elastomeric members 142 and 144. Each of the elastomeric members has a through bore formed in the center thereof to receive an adjacent end of pin 146.

Pin 146 passes through an opening in the upper end of blade 122. The opening in blade 122 receiving pin 146 is greater than the diameter of the pin 146. This permits the thin film viscous shear vertical damper, e.g. the blade 122 moving through the fluid housed in well 120, to be completely disconnected from the piston J so that floor vibrations are not transmitted to the precision machine being isolated during operation thereof. The elastomeric rings 142 and 144 adjustably introduce the vertical damper in a non-linear manner to dampen vibrations of the precision machine. Specifically, as the pin 146 is moved up and down the elastomeric rings range from being under zero compression to fully compressed to vary the damping effect of the vertical damper. Specifically, when the elastomeric rings are fully compressed maximum damping is achieved. Similarly, when the elastomeric rings are under zero or no compression the vertical damper has no effect or zero damping.

Figure 16:
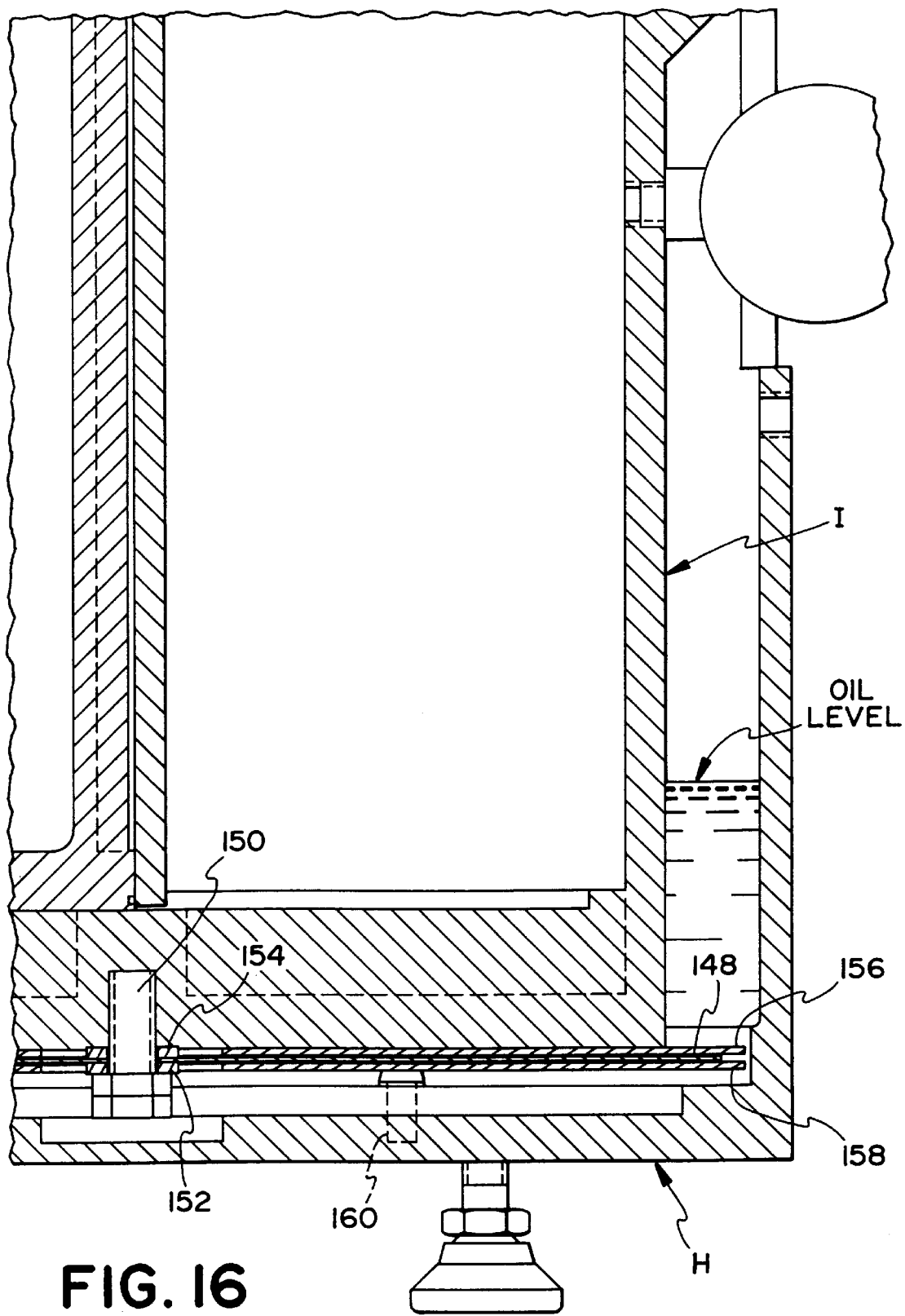
FIG. 16 is an enlarged view of yet another portion of the preferred embodiment illustrated in FIG. 12.

Referring to FIGS. 12 and 16, the preferred form of the horizontal damper will now be described. The horizontal damper is a thin film viscous shear damper and includes a circular blade 148 suspended from the bottom of the fluid tight cylinder by a bolt 150 and a pair of washers 152 and 154. Preferably, blade 148 is formed from spring steel and has a thickness of 0.020 of an inch. It should be noted that the blade 148 is fully immersed in a liquid. The blade 148 is positioned intermediate sliding plates 156 and 158. Like blade 148, sliding plates 156 and 158 are fully immersed in a liquid. Sliding plates 156 and 158 are freely suspended in the liquid. Three screws 160 are circumferentially spaced and act as a stop to limit the downward movement of lower plate 158. Both plates 156 and 158 are preferably circular in shape and as seen in FIGS. 12 and 16 have a diameter greater than the diameter of blade 148.

The horizontal damper acts in the following manner. As the fluid tight cylinder is swung in the horizontal direction as a result of vibrations having a horizontal component, blade 148 moves in the liquid along a horizontal path. The viscous forces created between blade 148 and plates 156 and 158 in turn cause the plates 156 and 158 to move with blade 148. Once the plates 156 and 158 hit the wall of the support stand H, the blade 148 and fluid tight cylinder I move relative to the plates 156 and 158.

A shear force is created by the relative movement of: (1) the bottom surface of the fluid tight cylinder I and the top surface of the upper plate 156; (2) the bottom surface of the sliding plate 156 and the top surface of the blade 148; and, (3) the bottom surface of the blade 148 and the top surface of the lower plate 158. It will be readily appreciated that this arrangement of the sliding plates and the blade 148 significantly increases the surface area thereby enhancing the shearing force during horizontal movement of the fluid tight cylinder I over the arrangement illustrated in FIGS. 10 and 11. It should be noted that additional sets of two sliding plates cooperating with a blade may be added to further enhance the damping characteristics by enlarging the bolt 150, enlarging the support stand H relative to the fluid tight cylinder I and adding spacing washers. Similarly, the vertical damping effect can be enhanced in the same manner.

While this invention has been described as having a preferred design, it is understood that it is capable of further modifications, uses and/or adaptions of the invention following in general the principle of the invention and including such departures from the present disclosure as come within the known or customary practice in the art to which the invention pertains and as maybe applied to the central features hereinbefore set forth, and fall within the scope of the invention and the limits of the appended claims.

What is claimed is:

1. An isolation unit for isolating a precision machine from vibrations, comprising:

a) a support member having a base plate;

b) a fluid tight housing operably connected to said support member, said fluid tight housing including upper and lower portions;

c) a flexible sealing element for sealing said upper portion of said fluid tight housing;

d) a piston operably associated with said flexible sealing element;

e) a fluid shear damper for producing a shearing strain for damping vibrations generated by the precision machine, said fluid shear damper including a damping plate positioned intermediate said fluid tight housing and said base plate.

2. An isolation unit as set forth in claim 1, and further including:

a) first and second sliding plates, said first and second sliding plates being positioned on opposite sides of said damping plate.

3. An isolation system as set forth in claim 2, wherein:

a) said damping plate, said first sliding plate and said second sliding plate are substantially circular in shape.

4. An isolation system as set forth in claim 3, wherein:

a) said damping plate has a first diameter and said first sliding plate has a diameter substantially equal to said second sliding plate and greater than said first diameter of said damping plate.

5. An isolation unit as set forth in claim 1, and further including:

a) said fluid shear damper is a horizontal damper for damping vibrations having a horizontal component.

6. An isolation system as set forth in claim 5, wherein:

a) said horizontal damper is a thin film viscous shear damper.

7. An isolation unit for isolating a precision machine from vibrations, comprising:

a) a support member;

b) a fluid tight housing operably connected to said support member, said fluid tight housing including upper and lower portions;

c) a flexible sealing element for sealing said upper portion of said fluid tight housing;

d) a piston operably associated with said flexible sealing element;

e) a fluid shear damper for producing a shearing strain for damping vibrations, said fluid shear damper being positioned in said fluid tight housing, said fluid shear damper including a substantially flat damping plate, said damping plate having a substantially uniform thickness; and, g) a connector for connecting said fluid shear damper to said piston.

8. An isolation system as set forth in claim 7, and wherein:

a) said fluid shear damper includes a fluid tight well adapted to receive said damping plate.

9. An isolation system as set forth in claim 7, wherein:
a) said damping plate has a through bore formed therein having a first diameter; and,
b) said connector includes a pin passing through said through bore of said damping plate, said pin having a diameter less than said first diameter permitting relative movement between said damping plate relative to said pin.

10. An isolation system as set forth in claim 7, wherein:
a) said damper is a vertical damper for damping vibrations having a vertical component.

11. An isolation system as set forth in claim 10, wherein:
a) said vertical damper is a thin film viscous shear damper.

12. An isolation system as set forth in claim 11, further including:
a) a horizontal damper for damping vibrations having a horizontal component.

13. An isolation system as set forth in claim 12, wherein:
a) said horizontal damper is a thin film viscous shear damper.

14. An isolation system for isolating a precision machine from vibrations, comprising:

a) a fluid damper for damping internal excitations generated by a precision machine, said fluid damper including a thin, flat damping plate for generating a shearing force when moved through a fluid, said damping plate having a thickness of approximately 0.020 inches, said fluid damper being a vertical damper for damping internal excitations generated by said precision machine having a vertical component, said fluid damper including a fluid tight well adapted to receive said damping plate;
b) an adjustable stiffener operably connected with said fluid damper for automatically adjusting the damping effect of said damper on internal excitations generated by said precision machine;
c) a fluid tight cylinder for housing said damping plate and said fluid tight well; and,
d) a flexible sealing element for sealing said fluid tight cylinder, said adjustable stiffener being positioned intermediate said flexible sealing element and said fluid tight well.

* * * * *